(12) United States Patent
Edwards et al.

(10) Patent No.: US 9,651,708 B2
(45) Date of Patent: May 16, 2017

(54) METHOD OF MAPPING RESERVOIR FLUID MOVEMENT USING GRAVITY SENSORS

(75) Inventors: Carl M. Edwards, Katy, TX (US); Antonius M. Loermans, Dhahran (SA)

(73) Assignee: BAKER HUGHES INCORPORATED, Houston, TX (US)

( * ) Notice: Subject to any disclaimer, the term of this patent is extended or adjusted under 35 U.S.C. 154(b) by 1193 days.

(21) Appl. No.: 13/449,788

(22) Filed: Apr. 18, 2012

(65) Prior Publication Data

US 2012/0271549 A1   Oct. 25, 2012

Related U.S. Application Data

(60) Provisional application No. 61/477,890, filed on Apr. 21, 2011.

(51) Int. Cl.
*G01V 7/00* (2006.01)

(52) U.S. Cl.
CPC .......... *G01V 7/00* (2013.01); *G01V 2210/622* (2013.01)

(58) Field of Classification Search
CPC .... G01V 7/00; G01V 7/02; G01V 2210/6169; G01V 2210/62; G01V 2210/622; G01V 2210/6224; G01F 19/00
USPC ............................................ 702/6, 9, 10, 11
See application file for complete search history.

(56) References Cited

U.S. PATENT DOCUMENTS

| 4,507,958 | A | * | 4/1985 | Russell | ................. E21B 47/022 235/375 |
| 5,448,912 | A | * | 9/1995 | Black | ................... G01V 11/005 73/152.02 |
| 5,892,151 | A | | 4/1999 | Niebauer et al. | |
| 6,125,698 | A | * | 10/2000 | Schweitzer et al. | ........ 73/382 G |
| 6,612,171 | B1 | | 9/2003 | Stephenson et al. | |
| 6,813,564 | B2 | | 11/2004 | Eiken et al. | |
| 6,954,698 | B2 | * | 10/2005 | Tryggvason | ...................... 702/5 |
| 7,047,170 | B2 | | 5/2006 | Feldman et al. | |
| 7,239,577 | B2 | | 7/2007 | Tenghamn et al. | |
| 7,406,390 | B2 | * | 7/2008 | Niebauer et al. | ................ 702/85 |
| 2003/0220739 | A1 | * | 11/2003 | Feldman | .................. G01V 7/06 702/2 |
| 2004/0000910 | A1 | * | 1/2004 | Tryggvason | ........... G01V 11/00 324/331 |
| 2005/0240350 | A1 | | 10/2005 | Engebretson et al. | |
| 2010/0161226 | A1 | * | 6/2010 | Homan | ............................ 702/8 |

(Continued)

OTHER PUBLICATIONS

Saad, Understanding gravity gradients—a tutorial,2006, Saad GeoConsulting, pp. 1-10.*

(Continued)

*Primary Examiner* — John Breene
*Assistant Examiner* — Mohammad Islam
(74) *Attorney, Agent, or Firm* — Mossman Kumar & Tyler PC (57) ABSTRACT

The present disclosure relates to methods and apparatuses for acquiring multi-component gravity information for an earth formation. More particularly, the present disclosure relates to estimating the movement of fluid in an earth formation using at least one gravimeter configured to generate multi-component gravity information. The method may include estimating density changes in the earth formation. The method may include estimating a position of the at least one gravimeter. The apparatus may include a multi-component gravimeter configured to estimate gravity vectors for each vector component.

16 Claims, 4 Drawing Sheets

(56) References Cited

U.S. PATENT DOCUMENTS

| | | | |
|---|---|---|---|
| 2010/0185393 A1* | 7/2010 | Liang et al. | 702/7 |
| 2010/0286967 A1* | 11/2010 | Vasilevskiy | G01V 11/00 703/2 |
| 2011/0042073 A1* | 2/2011 | Legendre et al. | 166/250.01 |
| 2011/0042074 A1* | 2/2011 | Goldberg | E21B 41/0064 166/250.01 |
| 2011/0185806 A1* | 8/2011 | Pfutzner | G01V 7/06 73/152.54 |
| 2011/0191027 A1 | 8/2011 | Pfutzner et al. | |
| 2011/0196636 A1 | 8/2011 | Edwards | |
| 2012/0010817 A1* | 1/2012 | Mann | G01V 7/16 702/6 |
| 2012/0232871 A1* | 9/2012 | Priezzhev et al. | 703/10 |

OTHER PUBLICATIONS

Vasilevskiy et al., Monitoring Reservoir Fluids with Surface and Borehole Gravity Sensors, May 2010, EarthDoc, pp. 1-6.*
Krahenbuhl et al., Joint inversion of surface and borehole 4D gravity data for continuous characterization of fluid contact movement, 2008, SEG, pp. 726-730.*
Maria et al., Validating airborne vector gravimetry data for resource exploration, 2006,Geophysics, pp. J71-J80.*
Kwon, Airborne Vector Gravimetry Using GPS/INS, Apr. 2000, pp. 1-37.*
Geertsma, J., "Land subsidence above compacting oil and gas reservoirs," Jnl of Petroleum Technology, SPE 3730 (1973).
Lawson, C.L. et al., "Solving Least Square Problems," book published by Society for Industrial and Applied Mathematics, Philadelphia (1995).
Li, Y., et al., "3-D inversion of gravity data," Geophysics vol. 63, pp. 109-119, doi:10.1190/1.1444302 (1998).
Kwon, J., Airborne vector gravimetry using GPS/INS. Columbus, Geodetic Science and Surveying, Department of Civil and Environmental Engineering and Geodetic Science, Ohio State University: Report No. 453. http://www.geology.osu.edu/~jekeli.1/OSUReports/reports/report_453.pdf. (Apr. 2000).
Chausseriau, P. and M. Chouteau, "3D gravity inversion using a model of parameter covariance." Journal of Applied Geophysics 52(1): 59-74 (2003).
Bate, D., "4D reservoir volumetrics: a case study over the lzaute gas storage facility." first break 23: 69-71 http://www.firstbreak.org/. (2005).
Eichkitz, C. G., "A model study on time-lapse microgravity for reservoir monitoring," Studienzweig Angewandte Geophysik. Leoben, Montanuniversität Leoben: 153. Dipl.-Ing. (2005).
Annecchione, M. A., et al., "Validating airborne vector gravimetry data for resource exploration." Geophysics 71(6): J71-J80. doi:10.1190/1.2360188. http://link.aip.org/link/?GPY/71/J71/1 (2006).
Ander, M. E., et al., "A new approach to subsurface gravity," 2006 SEG Annual Meeting, New Orleans, Society of Exploration Geologists (Oct. 2006).
Brady, J.L., et al., "Results of the world's first 4D microgravity surveillance of a waterflood—Prudhoe Bay, Alaska," 2006 SPE Annual Technical Conference and Exhibition, San Antonio, Texas, Society of Petroleum Engineers. SPE 101762 (2006).
Vasilevskiy, A. et al, "Feasibility study of 4D microgravity method to monitor subsurface water and gas movements," SEG International Exposition and 77th Annual Meeting, San Antonio, Society for Exploration Geophysicists (Sep. 23-28, 2007).
Meyer, T. J., "Lockheed Martin Ventures development of unique borehole gravity sensor," 2007 SEG Annual Forum, San Antonio, Society for Exploration Geophysicists (Sep. 24, 2007).
Davis, K., et al., "Time-lapse gravity monitoring: A systematic 4D approach with application to aquifer storage and recovery." doi:10.1190/1.2987376 (2008).
Li, X., et al., "Ground-vehicle INS/GPS vector gravimetry," Geophysics 73(2): I1-10 (2008).
Dashevsky, Y. et al.,"Application of surface and borehole gravity for monitoring the movement of reservoir fluids," Baker Hughes 2008 Technology Forum, Houston, Baker Hughes Inc. (Oct. 14-16, 2008).
Sugihara, M., et al., "Geothermal reservoir monitoring with a combination of absolute and relative gravimetry." Geophysics 73(6): WA37-WA47 (2008).
Krahenbuhl, R. A. et al., "Joint inversion of surface and borehole 4D gravity data for continuous characterization of fluid contact movement." SEG Technical Program Expanded Abstracts 27(1): 726-730. doi:10.1190/1.3063750. http://link.aip.org/link/?SGA/27/726/1 (2008).
Meyer, T. J., "Monitoring water front advancements with down-hole gravity sensors." SEG Technical Program Expanded Abstracts 27(1): 721-725. doi:10.1190/1.3063749. http://link.aip.org/link/?SGA/27/721/1 (2008).
Vasilevskiy, A., et al., "Monitoring reservoir fluids with surface and borehole gravity sensors," St. Petersburg 2010 (EAGE Annual Conference), St. Petersburg, Russia, European Association of Geoscientists and Engineers (Apr. 5-8, 2010).

* cited by examiner

METHOD OF MAPPING RESERVOIR FLUID MOVEMENT USING GRAVITY SENSORS

CROSS-REFERENCE TO RELATED APPLICATION

This application claims priority from U.S. Provisional Patent Application Ser. No. 61/477,890, filed on 21 Apr. 2011.

FIELD OF THE DISCLOSURE

In one aspect, the present disclosure generally relates to methods and apparatuses for acquiring multi-component gravity information for an earth formation. More particularly, the present disclosure relates to estimating the movement of fluid in an earth formation using multi-component gravity information.

BACKGROUND OF THE DISCLOSURE

Hydrocarbons in earth formations, such as reservoirs, are subject to the migration of fluids (oil, water, gas, etc.) over time. Detecting and measuring the movement of these fluids may be useful for estimating the producible hydrocarbon content of an earth formation and improving hydrocarbon recovery. The hydrocarbon movement may also be used to estimate the rate of depletion of a reservoir. One way of estimating hydrocarbon movement may be through the use of gravity measurements. However, the use of gravity measurement may be limited by various factors, including, but not limited to, availability of suitable tools and the expensive nature of gravimeters, which may cost tens of thousands of dollars.

SUMMARY OF THE DISCLOSURE

In aspects, the present disclosure is related to methods and apparatuses for acquiring multi-component gravity information for an earth formation. More particularly, the present disclosure relates to estimating the movement of fluid in an earth formation using multi-component gravity information.

One embodiment according to the present disclosure includes a method of acquiring gravity information for an earth formation, the method comprising: acquiring the gravity information for the earth formation using at least one gravimeter, the at least one gravimeter being configured to generate multi-component gravity information.

Another embodiment according to the present disclosure includes an apparatus for acquiring gravity information for an earth formation, the apparatus comprising: at least one gravimeter configured to generate multi-component gravity information for the earth formation.

Examples of some features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure generally relates to methods and apparatuses for acquiring multi-component gravity information for an earth formation. More particularly, the present disclosure relates to estimating the movement of fluid in an earth formation using at least one gravimeter configured to generate multi-component gravity information. The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Herein, the term "information" may include, but is not limited to, one or more of: (i) raw data, (ii) processed data, and (iii) signals. A "gravimeter" may be any device configured to estimate acceleration due to the gravitational properties of matter. The at least one gravimeter may include a vector gravimeter. A "vector gravimeter" may be any device configured to estimate the vector components of acceleration due to gravitational properties of matter. A vector gravimeter may be formed using three single axis gravimeters with linearly independent orientations.

The at least one gravimeter may be deployed at the surface of or within the earth formation in or near a volume of interest. The gravimeter may be configured for temporary or permanent deployment. The volume of interest may be a hydrocarbon reservoir. In some embodiments, the at least one gravimeter may include multiple vector gravimeters positioned in one or more boreholes penetrating an earth formation. During the deployment of the gravimeter, the orientation of the gravimeter, with respect to a global coordinate system, may be measured using a vector magnetometer or other equivalent device known by those of skill in the art. The gravimeter orientation may be measured by noting the direction of the earth's magnetic field and the local gravity vector with respect to the gravimeter's local coordinate system. The gravimeter may be in communication with the reservoir rock for the duration of a monitoring project. In some embodiments, one or more surface gravimeters may be used with a gravimeter located downhole. In other embodiments, all gravimeters may be located at the surface.

Measurements taken by each gravimeter may include multi-component gravity vectors. In some embodiments, the multi-component gravity measurements may be taken at different times, thus providing a log of the gravity vector including measurements for each vector component. This log may provide a record of how the gravity vectors at a specific position change from one time to another. By subtracting the gravity vectors at a first time from the gravity vectors at a second time, discrete differences in the gravity vectors may be estimated for each vector component. A "discrete" difference relates a difference between vectors where each vector component is independently estimated (such as with a multi-component gravimeter). A discrete difference may be contrasted with a calculated difference in that a discrete difference involves estimating each vector component for each dimension of a multi-dimensional vector and a calculated difference involves deriving vector components using the direction and magnitude of a single multi-dimensional vector. For example, using a multi-component gravimeter allows the subtractions of sets of multi-component vectors for estimating differences, where each vector component has been discretely measured by the gravimeter. The use of multi-component gravimeters may be advantageous where the vector gravimeter may need to be more sensitive along an axis of one or more vector components than the axis of another vector component. For example, in a mostly horizontal slab of a formation, a gravimeter positioned at a depth within the slab may require higher sensitivity to horizontal changes in gravity than vertical changes.

The set of multi-component gravity vector differences may be used to estimate a change in density of the earth formation and/or a change in total mass of the volume of interest. The changes in density and/or total mass may be estimated using an inversion, a forward modeling equation, or other well known techniques for the change in density/total mass within the earth formation. The density/total mass changes may be interpreted to map spatial changes to the volume of interest's fluid content. These maps may be used to make production decisions and improve the total amount of hydrocarbons recovered from the volume of interest.

In some embodiments, the multi-component gravity vector measurements may be transformed from the sensor coordinate system to the global coordinate system and compensated for known natural phenomena, including time-varying phenomena. Known time-varying natural phenomena may include, but are not limited to, earth tides. Other natural phenomena may include acute events including, but not limited to, volcanism and seismic events. Compensating for known phenomena may increase accuracy of the gravity information for the volume of interest.

Additionally, gravity vector accuracy may be improved by reducing the distance between the gravimeter and the volume of interest in the earth formation may increase sensitivity of the gravimeter to changes in density/total mass and spatial resolution of the multi-component gravity information. Positioning at least one gravimeter downhole may improve the proximity of the gravimeter to the volume of interest when the volume of interest is located below the surface of the earth. The quality of the gravity information may also be improved by deploying multiple gravimeters in boreholes and/or at the surface. The improved sensitivity and resolution of vector gravimeters deployed downhole may reduce the total number of gravimeters used to monitor a given reservoir.

When vector gravimeters remain located in substantially the same position between the times of gravity measurements, vector components of gravity at the gravimeter position may be estimated. However, when a gravimeter has been moved (even if it is then moved back to the same location) between times of gravity measurements, only the magnitude of the gravity vector may be estimated, not the components of the gravity vector. Herein, the term "position" refers to depth, location, and/or orientation. When a gravimeter is permanently placed in the earth formation or on the surface above the earth formation, the reference coordinate system exists for estimating components of the gravity vector at the gravimeter. Herein the term "permanent" relates to the gravimeter retaining the same depth, location, and orientation between relevant gravity measurements periods.

Vector gravimeters may be installed in boreholes located in or near a volume of interest and, further, may be installed in such a manner so that the orientation of the gravimeter's coordinate system is known with respect to a reference coordinate system. The reference coordinate system may be global to the extent of a region or volume of the earth that contains the hydrocarbon reservoir. For example, the reference coordinate system might be $$x, y, z \Leftrightarrow \text{North, East, Down,} \quad (1)$$

where down is defined as the initial direction of gravity at the time of installation; north is defined as the direction of the Earth's magnetic field that is perpendicular to the initial direction of gravity; and east is defined as the direction perpendicular to down and north. The orientations of the vector gravimeters with respect to the reference coordinate system may be stored for later use.

Estimates of the gravity vectors may be made periodically at all sensor stations equipped with gravimeters. The estimates may then be transformed from the sensor coordinate system to the reference coordinate system. Changes in the vector components in the transformed measurements may then be used to estimate changes in the reservoir's fluid distribution using well-known inversion and/or forward modeling techniques.

When used with vector gravimeters as permanent sensors, the local coordinate system may remain fixed in orientation to the global coordinate system. Thus, if the orientation of each sensor with respect to the global coordinate system is known initially, then it is known for the duration of the measurement of the gravity components. The components of the gravity vector may then be transformed for the local coordinate system of the sensor to the global coordinate system and changes in these components may be used to model changes in the fluid distribution within the earth formation.

If g' is the gravity vector in the gravimeter's local coordinate system and b' is the earth's magnetic field vector transformed to the gravimeter's local coordinate system, then the unit vectors for the global reference system may be defined in the gravimeter's local coordinate system by the following transformations:

$$\hat{z}'_G = g'/|g'|;$$

$$\hat{y}'_G = \hat{z}'_G \times b'/|b'|;$$

$$\hat{x}'_G = \hat{y}'_G \times \hat{z}'_G \quad (2)$$

In eqn. (2), the primes represent the vectors in the gravimeter's local coordinate system. The DCM rotation matrix may be given by $$R = \begin{pmatrix} (\hat{x}'_G)_{x'} & (\hat{y}'_G)_{x'} & (\hat{z}'_G)_{x'} \\ (\hat{x}'_G)_{y'} & (\hat{y}'_G)_{y'} & (\hat{z}'_G)_{y'} \\ (\hat{x}'_G)_{z'} & (\hat{y}'_G)_{z'} & (\hat{z}'_G)_{z'} \end{pmatrix}. \quad (3)$$

The elements of R may be the direction cosines between the global coordinate system unit vectors and the local coordinate system unit vectors. Using the DCM, the gravity vector in the local frame of the gravimeter may then be transformed to the global coordinate system by $$g = R^{-1} g'. \tag{4}$$

This transform is valid for all subsequent measurements by the gravimeter assuming that the gravimeter remains substantially fixed in the earth formation. The substantially fixed position of the gravimeter in the earth formation may be subject to movement due to tectonic activity; however, tectonic induced movement is generally small compared to the typical movement of fluid fronts in hydrocarbon reservoirs. Further, the formation may tend to move as an entire unit, which may minimize changes in the gravity vector due to tectonic movement. Also, the gravimeter may be subject to the change of direction of the earth's magnetic field over the earth's surface. These changes in direction may result in a slight distortion of the fluid distribution changes estimated by the gravimeter. Generally these distortions not large enough to be substantial relative to fluid movements. If the distortion were to prove to be too large, then another coordinate transformation may be performed to account for the distortion. Finally, the gravimeters might move because of reservoir compaction and subsidence. Compaction may be caused by a reduction in pore pressure during hydrocarbon recovery from the earth formation. For many oil reservoirs, especially where pressure maintenance is performed via water injection, the reduction in pore pressure is small over the lifetime of the reservoir. Thus, in most cases, compaction and subsidence would only be a small perturbation on the modeled fluid distributions.

Let $g'_i(t_j)$ be the gravitational vector measured in the reference frame of the sensor at $r_i$, as measured in the global frame, and at time $t_j$. The gravitational vector may be adjusted to account for any time varying effects, such as earth tides. This measurement may be transformed to the global reference frame by the transform, $R_i$, which may be determined at the time each sensor is placed in the reservoir. Then eqn. 4 may be expressed as $$g_i(t_j) = R_i^{-1} g'_i(t_j). \tag{5}$$

The time-lapse difference in the vectors may be found by subtraction.

$$\Delta g_i = g_i(t) - g_i(0) \tag{6}$$

The time, t=0, may be some time after all the sensors have been positioned in and/or on the earth formation. Indeed, this time, t=0, may be arbitrary, and the difference could be formed using data from any two different times.

The gravitational vector may be estimated from the Newton's law of gravitation:

$$g_i = G \int d^3 r_0 \frac{\rho(r_0)}{|r_0 - r_i|^3} (r_0 - r_i), \tag{7}$$

where the integral is over all space (or at least over all nearby space including the earth and its atmosphere). The contributions from massive bodies farther from earth have been accounted for by previously adjusting the data for earth tides and other effects. The volume of integration may be divided into two parts for the purposes of mapping reservoir fluid movement. Thus, $$g_i = g_B - G \int_{Reservoir} d^3 r_0 \frac{\rho(r_0)}{|r_0 - r_i|^3} (r_0 - r_i), \tag{8}$$

where $g_B$ may be the background acceleration caused by all mass outside the reservoir, which may be assumed to be constant. The density of the reservoir's material, $\rho$, is time dependent. Thus when the difference is formed, $$\Delta g_i = -G \int_{Reservoir} d^3 r_0 (\Delta \rho(r_0)) \frac{(r_0 - r_i)}{|r_0 - r_i|^3}; \tag{9}$$

$$\Delta \rho(r_0) = \rho(r_0, t) - \rho(r_0, 0).$$

The change in the density within the earth formation may be related directly to the change in saturation as the hydrocarbons are being produced from a reservoir within the earth formation.

$$\Delta \rho(r_0) = \sum_{m=o,w,g} \phi(r_0) \Delta S_m(r_0) \rho_m; \tag{10}$$

$$\Delta S_m(r_0) = S_m(r_0, t) - S_m(r_0, 0).$$

where $\phi$ is the porosity of the earth formation; $S_m$ is the fluid saturation; and $\rho_m$ is the bulk fluid density; the subscripts o, w, g, represent oil, water and gas, respectively. The problem of mapping fluid front movement translates directly into mapping changes in density within the reservoir. The estimation may be subject to simplifying assumptions such as, for the many cases, assuming that are only changes in two fluids in the earth formation. For example, if the two fluids are oil and water, then $$\Delta \rho(r_0) = \phi(r_0) \Delta S_w(r_0)(\rho_w - \rho_o). \tag{11}$$

Another simplifying assumption could be assuming the porosity is constant throughout the reservoir.

Thus eqn. (9) may be solved for $\Delta \rho_j(r_0)$ as is common for time-lapse surface gravity surveys, and a variety of techniques are available. In addition, joint inversion of combined borehole and surface gravity measurements may also be performed. In the case of a joint inversion, the reservoir may be divided into K voxels or cells. If $r_{0,k}$ is the vector to the $k_{th}$ cell and $\Delta \rho_k = \Delta \rho(r_{0,k})$ is density difference in that cell, then the contribution to the gravity vector as measured by the $i_{th}$ sensor from the $k_{th}$ voxel is $$\Delta g_{z,i} = -G \Delta \rho_k(r_0) \hat{z} \left[ \int_{k^{th} \, voxel} d^3 s \, \frac{(r_{0,k} + s - r_i)}{|r_{0,k} + s - r_i|^3} \right]. \tag{12}$$

The integral in eqn. (12) depends only on $r_{0,k}$ and $r_i$. Thus $$\Delta g_{z,i} = (Q_z)_{ik} \Delta \rho_k; \tag{13}$$

$$(Q_z)_{ik} = -G \hat{z} \left[ \int_{k^{th} \, voxel} d^3 s \, \frac{(r_{0,k} + s - r_i)}{|r_{0,k} + s - r_i|^3} \right].$$

$\Delta g_{z,i}$ is a vertical component of the gravity vector; $(Q_z)_{ik}$ is a real number. Thus, eqn. (9) may become $$\gamma_z = Q_z \Delta \rho; \tag{14}$$

$$\gamma_z = (\Delta g_{z,1}, \Delta g_{z,2}, \ldots, \Delta g_{z,N})^T;$$

$$\Delta \rho = (\Delta \rho_1, \Delta \rho_2, \ldots, \Delta \rho_K)^T;$$

-continued $$Q_z = \begin{pmatrix} Q_{z11} & \cdots & Q_{z1K} \\ \vdots & \ddots & \vdots \\ Q_{zN1} & \cdots & Q_{zNK} \end{pmatrix}.$$

Density changes in the voxels may be solved using inversion techniques or other techniques known to those of skill in the art. If vector differences are used, then there are 3N measurements instead of N measurements. Then the model to be inverted becomes $$\gamma = Q\Delta\rho; \quad (15)$$

$$\gamma = (\Delta g_{x,1}, \Delta g_{x,2}, \ldots, \Delta g_{x,N}, \Delta g_{y,1},$$

$$\Delta g_{y,2}, \ldots, \Delta g_{y,N}, \Delta g_{z,1}, \Delta g_{z,2}, \ldots, \Delta g_{z,N})^T;$$

$$\Delta\rho = (\Delta\rho_1, \Delta\rho_2, \ldots, \Delta\rho_K)^T;$$

$$Q = \begin{pmatrix} Q_x \\ Q_y \\ Q_z \end{pmatrix};$$

$$(Q_\alpha)_{ik} = -G\hat{\alpha}\left[\int_{k^{th}\,voxel} d^3s \frac{(r_{0,k}+s-r_i)}{|r_{0,k}+s-r_i|^3}\right];$$

$$\hat{\alpha} \in \{\hat{x}, \hat{y}, \hat{z}\};$$

$$\Delta g_{\alpha,i} = -G\Delta\rho_k(r_0)\hat{\alpha}\left[\int_{k^{th}\,voxel} d^3s \frac{(r_{0,k}+s-r_i)}{|r_{0,k}+s-r_i|^3}\right];$$

$$\hat{\alpha} \in \{\hat{x}, \hat{y}, \hat{z}\}.$$

Eqn. (15) may be solved by any number of techniques known to those of skill in the art, including least-squares analysis.

It is important to recognize that the magnitude of the gravity vector as a whole is not sensitive to changes in density in the same horizontal slab of the reservoir as the measurements. The vertical component may be almost completely insensitive to fluid movement in the reservoir. However the horizontal component may be much more sensitive to the gravity changes due to fluid movement. Once the changes in density of the voxels in the reservoir are determined, they may be interpreted as images of changes to the fluid distribution or content within the reservoir by applying eqn. (10). The resultant maps of fluid distribution may then be used to make production decisions and improve the total amount of hydrocarbons recovered from the reservoir.

Benefits of the proposed methods and apparatuses may include multi-component estimates for gravitational acceleration, increased sensitivity and resolution for earth formation density and density changes, and more accurate fluid movement estimates in hydrocarbon reservoirs. One non-limiting embodiment of an apparatus configured to use the proposed technique is described below.

Figure 1:
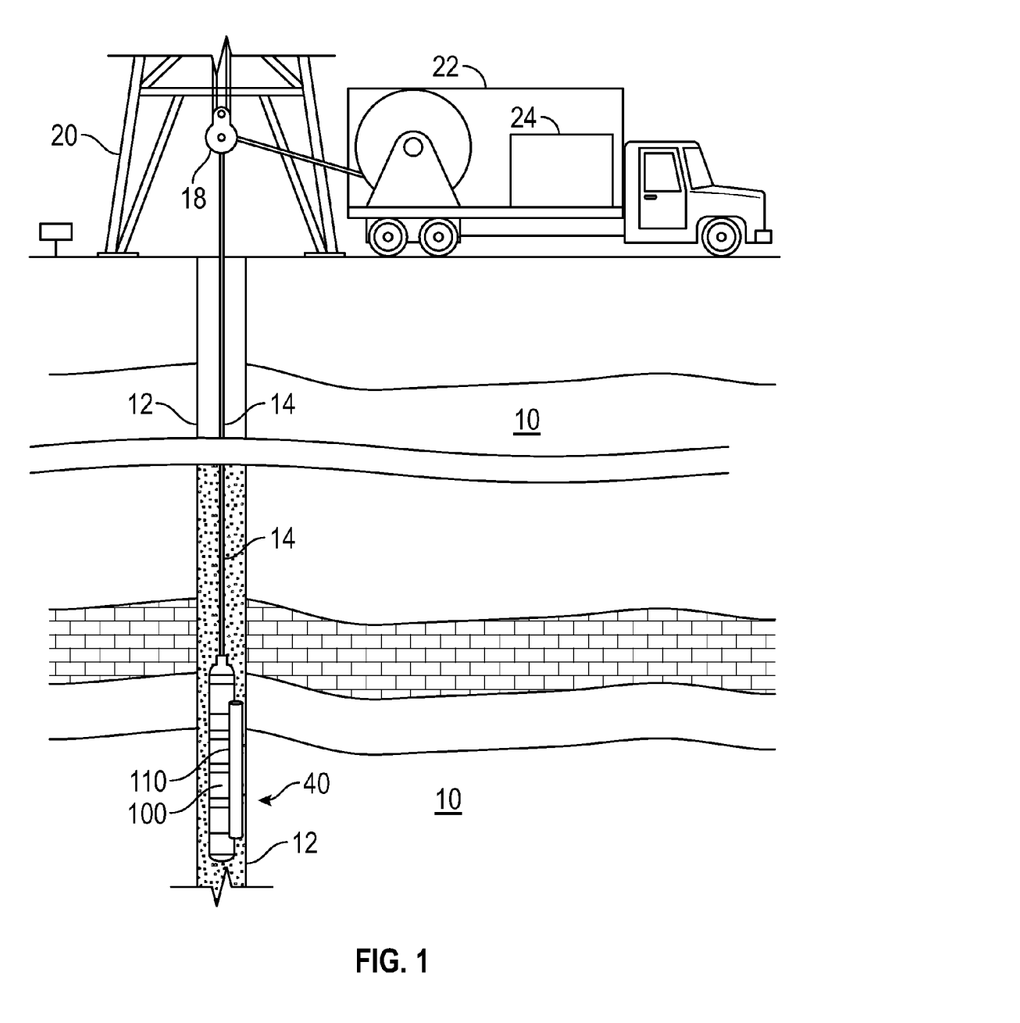
FIG. 1 shows a gravimeter being deployed along a wireline according to one embodiment of the present disclosure.

FIG. 1 shows one embodiment according to the present disclosure wherein a cross-section of a subterranean formation 10 in which is drilled a borehole 12 is schematically represented. Suspended within the borehole 12 at the bottom end of a non-rigid carrier such as a wireline 14 is bottom hole assembly (BHA) 40. The BHA 40 may include a gravimeter 100. The wireline 14 may be carried over a pulley 18 supported by a derrick 20. Wireline deployment and retrieval is performed by a powered winch carried by a service truck 22, for example. A control panel 24 interconnected to the gravimeter 100 through the wireline 14 by conventional means controls transmission of electrical power, data/command signals, and also provides control over operation of the components in the gravimeter 100. In some embodiments, the borehole 12 may be utilized to recover hydrocarbons. In other embodiments, the borehole 12 may be used for geothermal applications or other uses. In some embodiments, the gravimeter 100 may also be located on the surface, near the top of the borehole 12. The BHA 40 may also include a vector magnetometer 110.

The vector gravimeter 100 may be a multi-component device with a predetermined orientation, such as an angular orientation. The gravimeter 100 may, in a non-limiting embodiment, have three single axis gravimeters with sensitive axes configured to be at least linearly independent. In some embodiments, the sensitive axes may be configured to be mutually orthogonal. The gravimeter 100 may also include control electronics. The control electronics may be in the borehole or at a surface location. Single axis gravimeters must be oriented so that the sensitive axis is parallel to the gravity vector and usually require complicated mechanical mechanisms as well as leveling procedures. In contrast, the vector gravimeter 100 does not have to be oriented in any particular manner to measure the length of the gravity vector.

The gravimeter 100 may provide components of the gravity vector that may be known under that local coordinate system of the gravimeter, however, this information may not be usable with the orientation of the local coordinate system with respect to a global reference system, or at least a reference system that is valid over a region or volume that includes the earth formation, is unknown.

In some embodiments, the BHA 40 may be configured to deploy the gravimeter 100 within the borehole 12 to a fixed position. Here, the gravimeter 100 may be detachable from the BHA 40. The precise position of the gravimeter 100 may be estimated using methods well known within the hydrocarbon production community. An example would be to use the depth as measured along the borehole in combination with data from a well survey. At the selected depth, the gravimeter 100 may be positioned against the borehole wall 12, such as by a mechanism like a hydraulic cylinder, and attached to the earth formation or borehole casing by some method known to those skilled in the art of permanent sensing.

The vector magnetometer 110 may be used to estimate the direction of the earth's magnetic field relative to the BHA 40. When the gravimeter 100 is attached to the BHA 40, the alignment of the BHA's local coordinate system may be aligned with the gravimeter's local coordinate system. In some embodiments, differences between the two local coordinate systems may be quantified and noted. For example, the BHA 40 may be designed such that its local axes are coincident with the local axes of the gravimeter, or more precisely that the direction cosine matrix (DCM) is the identity matrix for the transformation between the local coordinate systems. Those skilled in the art will recognize that any number of local coordinate systems may be used. The magnetometer may have its own local coordinate system along with the gravimeter and the deployment tool. Indeed, these coordinates systems need not be precisely aligned; rather all that is necessary is that the DCM between each coordinate system be known. For the sake of simplicity in this example, it may be assumed that each DCM is an identity matrix.

A measurement of the gravity vector may be made by the gravimeter 100 before the attachment mechanism is retracted into BHA 40. Additionally, a measurement of the earth's magnetic field may be made by the vector magnetometer 110.

Figure 2:
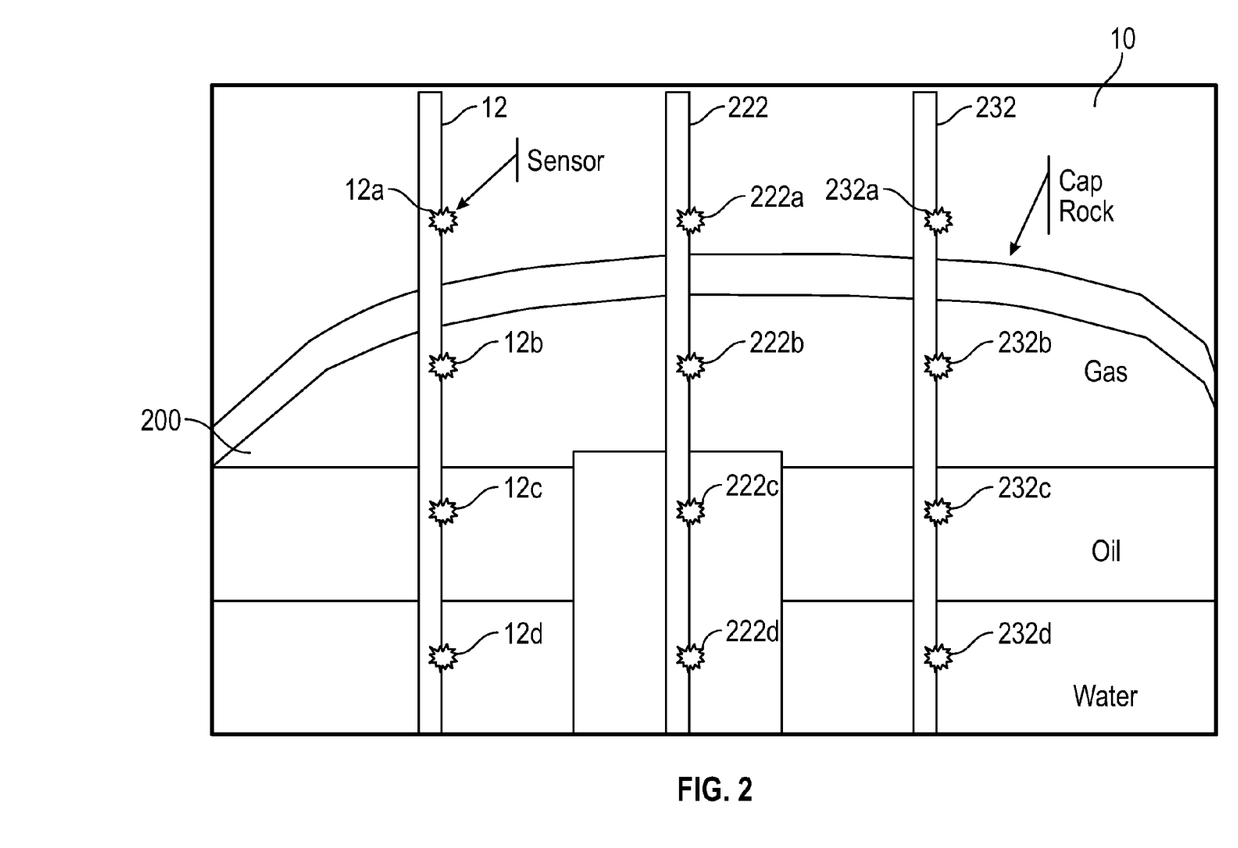
FIG. 2 shows a series of gravimeters deployed in a series of boreholes for one embodiment according to the present disclosure.

FIG. 2 illustrates a representative placement of vector gravimeters in or near a hydrocarbon reservoir 200 in the earth formation 10. In this example, the center borehole 222 is an injector well and the outer boreholes 12, 232 are producer wells. Each borehole 12,222,232 is shown with four vector gravimeters 12a-d, 222a-d, 232a-d placed in or near the reservoir 200. In other embodiments, one or more of the boreholes may be deviated or horizontal instead of vertical. The selected positions of the sensors 12a-d, 222a-d, 232a-d may not be critical as long as the positions are known to the normal precision of well logging and remain substantially fixed over the duration of the monitoring of the reservoir 200.

Figure 3:
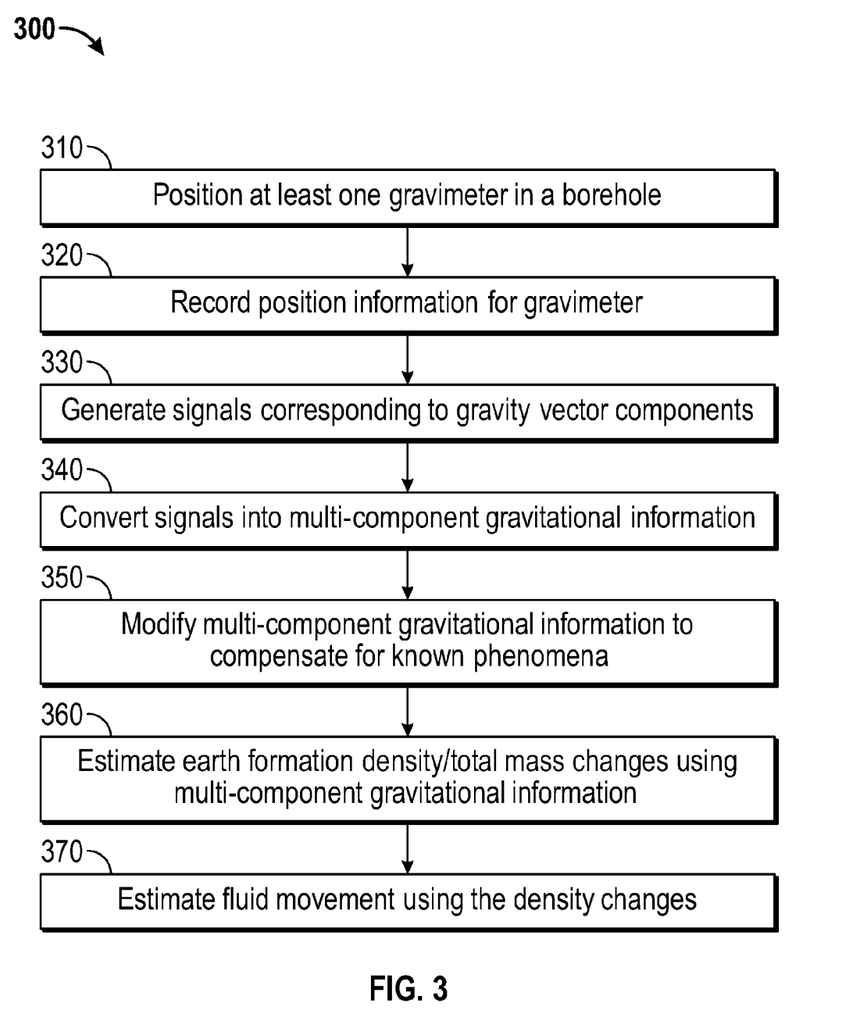
FIG. 3 is a flow chart of a method according to one embodiment of the present disclosure.

As shown in FIG. 3, one embodiment includes a method 300 according to the present disclosure for acquiring gravity information using gravimeter 100. Method 300 includes step 310, where the gravimeter may be positioned in the borehole 12. In step 320, the position information for the gravimeter may be recorded. Position information may include location (relative or global position), depth, and orientation (geographical, magnetic, etc.). In step 330, the vector gravimeter 100 may generate signals corresponding to gravitational acceleration for each of the vector components of gravity in the earth formation 10. In step 340, the signals may be transmitted to a processor configured to convert the signals into multi-component gravitational information. In step 350, the multi-component gravitational information may be modified to compensate for known phenomena. Known phenomena may include time varying events, such as earth tides, and acute events, such as volcanism and seismic disturbances. In step 360, density and/or total mass changes in the earth formation may be estimated using the multi-component gravity information. The estimation of the density/total mass changes may include a mathematical operation, such as, but not limited to, an inversion or a forward modeling. In step 370, the movement of fluid in the earth formation may be estimated using the estimated density changes. In some embodiments, step 350 may be optional. In some embodiments, step 360 may be omitted and fluid movement may be estimated directly from step 350. In some embodiments, steps 360 and 370 may be optional. In some embodiments, steps 330 and 340 (and optional steps 350, 360 and 370) may be repeated without repeating steps 310 and 320.

Figure 4:
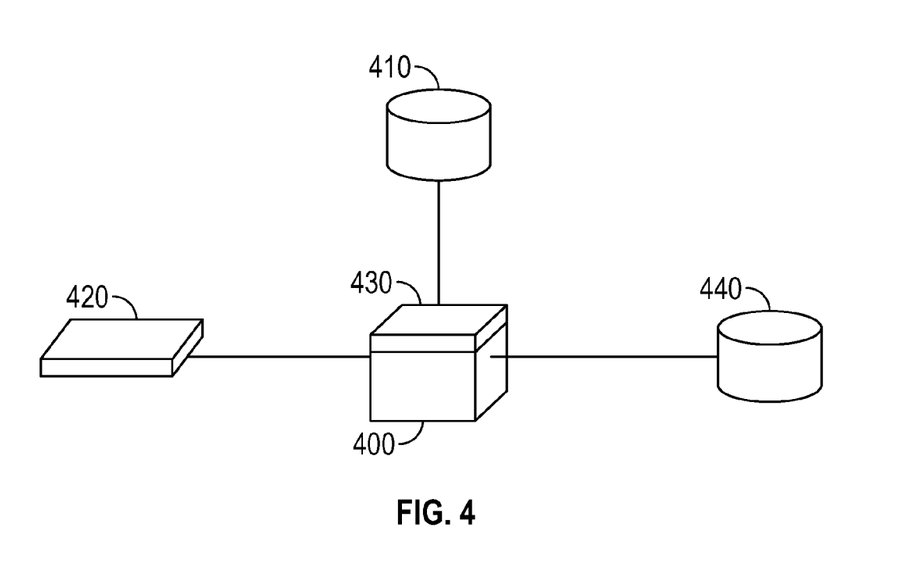
FIG. 4 shows schematic of a processor and its peripherals for processing the signals from the gravimeter for implementing one embodiment of the method according to the present disclosure.

As shown in FIG. 4, certain embodiments of the present disclosure may be implemented with a hardware environment that includes an information processor 400, an information storage medium 410, an input device 420, processor memory 430, and may include peripheral information storage medium 440. The hardware environment may be in the well, at the rig, or at a remote location. Moreover, the several components of the hardware environment may be distributed among those locations. The input device 420 may be any data reader or user input device, such as data card reader, keyboard, USB port, etc. The information storage medium 410 stores information provided by the detectors. Information storage medium 410 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 410 stores a program that when executed causes information processor 400 to execute the disclosed method. Information storage medium 410 may also store the formation information provided by the user, or the formation information may be stored in a peripheral information storage medium 440, which may be any standard computer information storage device, such as a USB drive, memory stick, hard disk, removable RAM, or other commonly used memory storage system known to one of ordinary skill in the art including Internet based storage. Information processor 400 may be any form of computer or mathematical processing hardware, including Internet based hardware. When the program is loaded from information storage medium 410 into processor memory 430 (e.g. computer RAM), the program, when executed, causes information processor 400 to retrieve detector information from either information storage medium 410 or peripheral information storage medium 440 and process the information to estimate a parameter of interest. Information processor 400 may be located on the surface or downhole.

Further, while FIG. 1 shows an embodiment deployed using a wireline 14. Embodiments of the present disclosure may be deployed via a carrier that includes, but is not limited to rigid carriers, non-rigid carriers, coiled tube, casing, liners, drill pipe, wirelines, wireline sondes, slickline sondes, e-lines, drop tools, self-propelled tractors, etc. The term "carrier" as used herein means any device, device component, combination of devices, media and/or member that may be used to convey, house, support, or otherwise facilitate the use of another device, device component, combination of devices, media and/or member.

While the foregoing disclosure is directed to the one mode embodiments of the disclosure, various modifications will be apparent to those skilled in the art. It is intended that all variations be embraced by the foregoing disclosure.

We claim:

1. A method of acquiring gravity information for an earth formation, the method comprising:
  acquiring the gravity information for the earth formation using at least one gravimeter, the at least one gravimeter being configured to generate multi-component gravity information wherein the multi-component gravimeter information includes discrete estimates for gravity in three-dimensions, wherein each discrete estimate comprises a vector component including a magnitude and a direction, comprising:
  generating signals with the at least one gravimeter corresponding to gravitational acceleration from each of the vector components of gravity in the earth formation; and
  converting the signals into the multi-component gravitational information; and
  estimating a change in a property of the earth formation based, at least in part, on discrete differences in the vector components of the multi-component gravity information over time, where the property includes at least one of: i) density and ii) total mass;
  estimating fluid movement using the estimated change in the property;
  using the estimated fluid movement for reservoir monitoring of a reservoir in the earth formation; and
  performing at least one of: i) using the estimated change for drilling a borehole in the earth formation; and ii) using the estimated change to optimize recovery of at least one hydrocarbon from the earth formation.

2. The method of claim 1, wherein the change in the property is estimated using an algorithm, wherein the algorithm includes at least one of: i) an inversion equation and ii) a forward modeling equation.

3. The method of claim 1, the at least one gravimeter being disposed in a borehole penetrating the earth formation.

4. The method of claim 1, wherein the multi-component gravity information includes vertical and horizontal gravity components of gravitational acceleration.

5. The method of claim 1, further comprising:
modifying the multi-component gravity information to compensate for at least one known natural phenomenon.

6. The method of claim 1, wherein the at least one gravimeter includes at least one of: i) a first multi-component gravimeter in the at least one borehole penetrating the earth formation at a first depth and a second multi-component gravimeter in the at least one borehole at a second depth and ii) a first multi-component gravimeter in a first borehole and a second multi-component gravimeter in a second borehole where the at least one borehole comprises the first borehole and the second borehole.

7. The method of claim 6, wherein the first depth is a surface of the earth.

8. The method of claim 1, wherein the at least one gravimeter comprises at least one vector gravimeter, and wherein the at least one vector gravimeter comprises at least three single axis gravimeters having linearly independent orientations.

9. The method of claim 1, further comprising: transforming the multi-component gravity information from a local coordinate system of the at least one gravimeter to a global reference coordinate system, wherein the local coordinate system includes three-dimensions and the global reference coordinate system includes three-dimensions.

10. The method of claim 1, further comprising:
modeling a volume of interest of the formation as a set of voxels;
using the multi-component gravitational information to estimate a change of the property of each voxel of the set; and
depicting the estimated change of the property of the voxels as an image of the volume of interest.

11. An apparatus for acquiring gravity information for an earth formation, the apparatus comprising:
at least one gravimeter configured to generate multi-component gravity information for the earth formation wherein the multi-component gravimeter information includes discrete estimates for gravity in three-dimensions, wherein each discrete estimate comprises a vector component including a magnitude and a direction, the at least one gravimeter configured to:
generate signals with the at least one gravimeter corresponding to gravitational acceleration from each of the vector components of gravity in the earth formation; and
convert the signals into the multi-component gravitational information;
and at least one processor configured to:
estimate a change in a property of the earth formation based, at least in part, on discrete differences in the vector components of the multi-component gravity information over time, where the property includes at least one of: i) density and ii) total mass;
estimate fluid movement using the estimated change in the property;
use the estimated fluid movement for reservoir monitoring of a reservoir in the earth formation; and
perform at least one of: i) using the estimated change for drilling a borehole in the earth formation; and ii) using the estimated change to optimize recovery of at least one hydrocarbon from the earth formation.

12. The apparatus of claim 11, further comprising:
estimating the change in the property using an algorithm, wherein the algorithm includes at least one of: i) an inversion equation and ii) a forward modeling equation; and
providing a map of fluid distribution generated from the estimated change.

13. The apparatus of claim 11, the at least one gravimeter being disposed in a borehole penetrating the earth formation.

14. The apparatus of claim 11, wherein the at least one gravimeter is configured to estimate values of vertical and horizontal gravity components of gravitational acceleration.

15. The apparatus of claim 11, the processor Maher configured to:
modify the multi-component gravity information to compensate for at least one known natural phenomenon.

16. The apparatus of claim 11, wherein the at least one gravimeter includes at least one of: i) a first multi-component gravimeter in the at least one borehole penetrating the earth formation at a first depth and a second multi-component gravimeter in the at least one borehole at a second depth and ii) a first multi-component gravimeter in a first borehole and a second multi-component gravimeter in a second borehole where the at least one borehole comprises the first borehole and the second borehole.

* * * * *